(12) United States Patent
Auriol

(10) Patent No.: US 8,668,420 B2
(45) Date of Patent: Mar. 11, 2014

(54) METHOD FOR ASSEMBLING COMPOSITE HARDWARE, AND RIVETING MEMBER ENABLING IMPLEMENTATION THEREOF

(75) Inventor: Pierre Auriol, Flourens (FR)

(73) Assignee: Eris Sarl, Flourens (FR)

( * ) Notice: Subject to any disclaimer, the term of this patent is extended or adjusted under 35 U.S.C. 154(b) by 538 days.

(21) Appl. No.: 12/935,310

(22) PCT Filed: Mar. 19, 2009

(86) PCT No.: PCT/FR2009/050468
§ 371 (c)(1),
(2), (4) Date: Dec. 22, 2010

(87) PCT Pub. No.: WO2009/122112
PCT Pub. Date: Oct. 8, 2009

(65) Prior Publication Data
US 2011/0116888 A1 May 19, 2011

(30) Foreign Application Priority Data

Apr. 4, 2008 (FR) .................................... 08 52280
Jul. 9, 2008 (FR) .................................... 08 54657

(51) Int. Cl.
*F16B 13/06* (2006.01)
(52) U.S. Cl.
USPC .......................................... 411/45; 29/525.06
(58) Field of Classification Search
None
See application file for complete search history.

(56) References Cited

U.S. PATENT DOCUMENTS

| 2,501,567 | A | * | 3/1950 | Huck | 411/39 |
| 4,784,550 | A | | 11/1988 | Wollar | |
| 5,181,816 | A | * | 1/1993 | Walsh | 411/57.1 |
| 5,333,980 | A | * | 8/1994 | Pratt et al. | 411/501 |
| 5,651,172 | A | * | 7/1997 | Auriol et al. | 29/512 |
| 5,746,557 | A | * | 5/1998 | Kaibach | 411/54.1 |
| 6,405,425 | B1 | * | 6/2002 | Eriksson | 29/525.06 |
| 6,749,384 | B1 | | 6/2004 | Ellis et al. | |
| 2002/0067973 | A1 | * | 6/2002 | Shinjo | 411/45 |

FOREIGN PATENT DOCUMENTS

EP 1 882 860 A 1/2008

OTHER PUBLICATIONS

International Search Report, Sep. 10, 2009, from International Phase of the instant application.

* cited by examiner

*Primary Examiner* — Gary Estremsky
(74) *Attorney, Agent, or Firm* — Jackson Patent Law Office

(57) ABSTRACT

The invention relates to a method for assembling parts (P1 and P2) in composite hardware by means of a riveting member (R), and is notable in that it comprises: using a bushing (200), the hollow core (230) of which has two different sections (231 and 232); using an insert (100) having no functional axial bearing surface for the radial swelling of the bushing (200) in the through-hole (T), but the diameter (D3) of which is capable of enabling the housing thereof, with no change in shape, in the first section (231) of the hollow core (230), and is also capable of enabling the forcible housing thereof in the second section (232); axially feeding the insert (100) into the bushing (200) such that the latter radially swells inside the through-hole (T) up to the small section (232) thereof and such that the recess well-defined by said small section is occupied by said insert (100); and ensuring, by means of a rivet set (400), the pressure on the first section (231) of the bushing (200) by the end that changes shape to ensure the bending thereof by radial centrifugal extension.

7 Claims, 10 Drawing Sheets

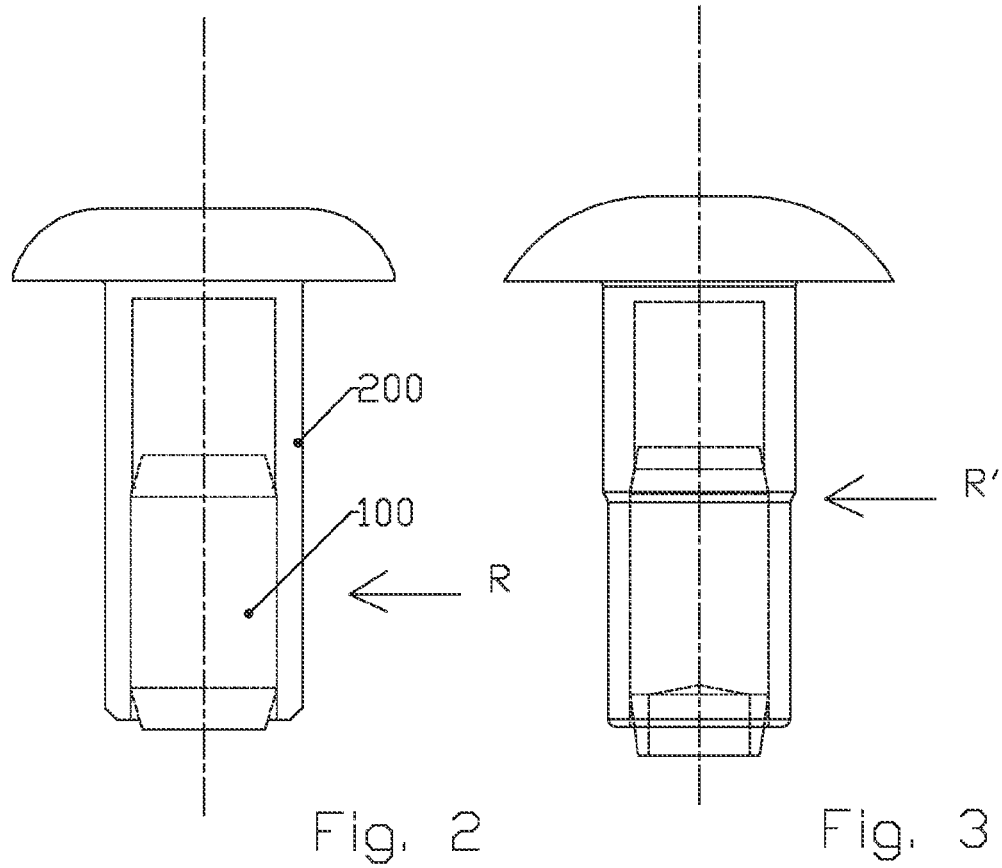
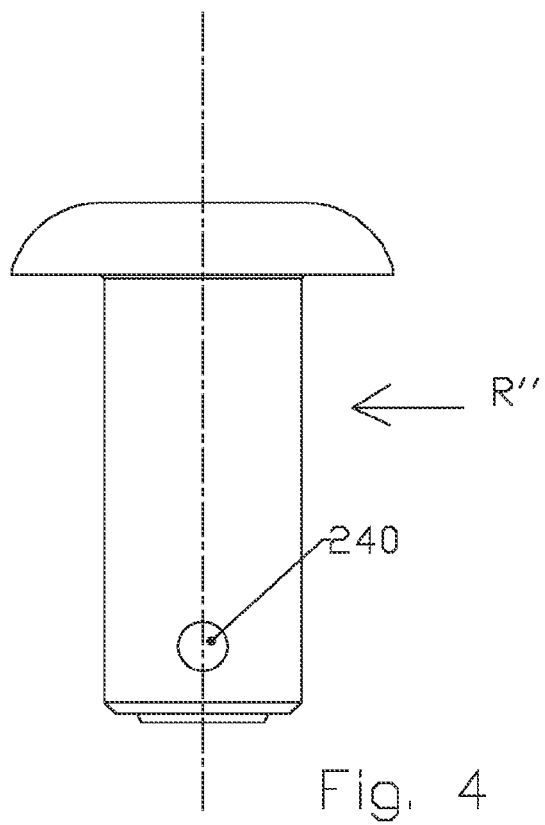
Fig. 2  Fig. 3
Fig. 4

METHOD FOR ASSEMBLING COMPOSITE HARDWARE, AND RIVETING MEMBER ENABLING IMPLEMENTATION THEREOF

FIELD OF APPLICATION OF THE INVENTION

The present invention relates to the field of rivets and in particular to adaptations enabling use thereof for fixing composite materials.

DESCRIPTION OF THE PRIOR ART

Fixing composite materials by means of rivets has various constraints, including:
- good fatigue strength of the assemblies must be guaranteed,
- damage to the composite material when the rivet is fitted must be avoided,
- the phenomenon of delamination must be avoided,
- shear strength must be optimised,
- tear resistance under traction must be optimised,
- fitting must not require countersinking at the head,
- fitting corresponding to that of current solid rivets (by crushing) must be able to be carried out in order to use conventional riveting machines,
- the cost must be improved.

Solid rivets, although inexpensive, are not suitable for fixing parts made from composite materials. This is because, when it is crushed, the material of the rivet bears on the corner or rim of the hole in order to form the bulb (also referred to as the head). This abutment is particularly high in terms of force and the consequence thereof is that the phenomenon of delamination occurs because of the high level of radial stresses located in the rim of the hole.

Semi-tubular rivets offer a bulb creation requiring less force to form the head than for a solid rivet but do not offer a fatigue strength equivalent to that of a solid rivet.

Finally, blind structure fixing rivets providing crimping make it possible to achieve the majority of the objectives sought but at a particularly high cost both in terms of manufacture and installation tooling.

DESCRIPTION OF THE INVENTION

Starting from the specification pre-established by the constraints defined for fixing in composite materials, the applicant carried out research that led to the design of an assembly method for composite materials and a particularly advantageous riveting member for implementation thereof.

According to the invention, the method of assembling parts made from composite materials uses a riveting member of the type comprising firstly an insert and secondly a sleeve adapted to at least partially contain the insert and having an end provided with a head and a tubular end able to be deformed with a view to constituting a bulb on one side of the materials to be assembled,
- a hole passing through the materials to be assembled being produced,
- the sleeve being introduced and held in the hole with its head in abutment on the rims of the end of the hole and so that its tubular end projects therefrom on the other side. The method is remarkable in that it consists of:
- using a sleeve the hollow core of which has two different sections, a first section starting from the tubular end to be deformed having a first diameter and a second section starting at the end of the first section and with a lesser diameter,
- using a insert not having a functional axial bearing surface for purposes of radial swelling of the sleeve in a hole but the diameter of which is able to allow housing thereof without deformation in the first section of the hollow core and able to allow forcible housing thereof in the second section,
- axially introducing the insert in the sleeve so that the latter swells radially inside the hole at its small section and the recess defined by this small section is occupied by said insert,
- providing, by means of a riveting die, a pressure at the end of the sleeve to be deformed on its first section in order to ensure folding thereof by centrifugal radial extension.

This feature is particularly advantageous in that it combines the advantages of solid rivets with semi-tubular rivets without increasing the cost thereof.

Thus the swelling of the sleeve within the hole and filling thereof by the insert will guarantee fatigue strength as well as good shear strength. In addition, the folding of the tubular end of the sleeve in order to form the bulb will enable said bulb to be created without great force. In addition, given that the folding will start along the length of the inserts simultaneously, just before or just after the swelling has commenced, that is to say when a part of the sleeve comes to be locked in the hole, the axial force imparted will necessarily tend to fold the material of the sleeve part situated outside, that is to say not gripped inside the hole. Thus the edge on the rivet head side of the hole passing through the materials to be assembled is protected from any damage. Thus one of the features of the assembly method of the invention is that it consists of producing a hole without countersinking in the composite material on the rivet head side. The time taken and the tooling required for such an operation are thus no longer necessary.

Another feature participating in the protection of the rivet head stems from the fact that the insert has no axial surface with a function of deforming the sleeve which, in its axial movement inside the sleeve, makes it possible to have only radial deformations appear. The insert will not pack the material of the sleeve in the rim of the rivet head. On the contrary, the presence of the insert will serve as a guide to the deformation of the external part of the sleeve so that folding thereof takes place uniformly. The production of a bulb under satisfactory conditions makes it possible to obtain a fixing having good tear strength. In addition, the configuration of such a riveting member makes it possible to use the tooling conventionally used for fitting a solid rivet.

According to another particularly advantageous feature, the method consists of pre-engaging the insert in the first section of the tubular end of the sleeve prior to the engagement of the riveting member in the hole. This feature avoids managing the handling of two parts and makes it possible to use the riveting member of the invention as a solid rivet.

The partial or total swelling of the sleeve part placed inside the hole provides a first gripping of the sleeve body inside the hole. Nevertheless, in order to optimise fixing, another feature of the method consists of continuing the folding until the folded end is crimped on the insert, which helps to create a structural fixing with optimised tear strength.

According to another particularly advantageous feature, the assembly method of the invention consists of using a sleeve the recess of which passes axially right through and inserting the insert through the end of the emerging recess of the head.

According to another particularly advantageous feature of the invention making it possible to optimise the locking of the fixing, the assembly method of the invention consists of using a sleeve the recess of which passes right through it and inserting the insert through the tubular end of the sleeve, the insert comprising dimensions such that its two ends are respectively crimped in the head of the sleeve on the one hand and in the bulb formed by the tubular end of the sleeve on the other hand.

The invention also concerns the riveting member for implementing the assembly method described above.

This riveting member is remarkable in particular in that the recess formed in the tubular part of the sleeve is extended below the head. In this configuration, the sleeve has two ends: a closed end equipped with a head and the other end being tubular and emerging, the insertion then taking place through said distal end.

This feature makes it possible to have available the greatest possible length of a sleeve part able to swell in the hole so as to produce a swelling and stressing of the walls of the hole that is as even as possible. According to another feature, the length of the small section corresponds to the minimum thickness of the elements made from composite materials to be fixed.

According to another feature, the recess provided in the hole is extended in the head so that the end of the insert can be crimped in said head in order to optimise locking. According to a preferred embodiment, the cross section of the recess formed in the head is less than the cross section with the smallest diameter of the recess formed in the sleeve.

According to another feature, the end of the insert on which the end of the folded sleeve is crimped is preformed with a recess that will facilitate its deformation while requiring less force and allowing deformation of the material without packing thereof on the edges of the hole. This recess may also be produced on the other end of the insert, which may then have a symmetrical configuration.

Likewise, the crimping can be improved by the external arrangement of grooves or flutes on the body of the insert.

Likewise, where one of the ends of the insert is crimped in the head, said end has the form of a cylindrical projection coaxial with the rest of the insert and the free end of which is itself provided with a recess facilitating deformation thereof.

The fundamental concepts of the invention having been disclosed above in their most elementary form, other details and features will emerge more clearly from a reading of the following description and with regard to the accompanying drawings, giving, by way non-limitative example, several embodiments of an assembly method and a riveting member according to the invention.

BRIEF DESCRIPTION OF THE DRAWINGS

FIG. 2 is a schematic drawing with an external view of the sleeve and insert assembled with the concealed edges visible, FIG. 3 is a schematic drawing of an external view of another embodiment of the riveting member, FIG. 4 is a schematic drawing of an external view of another embodiment of the riveting member.

DESCRIPTION OF PREFERRED EMBODIMENTS

Figure 1:
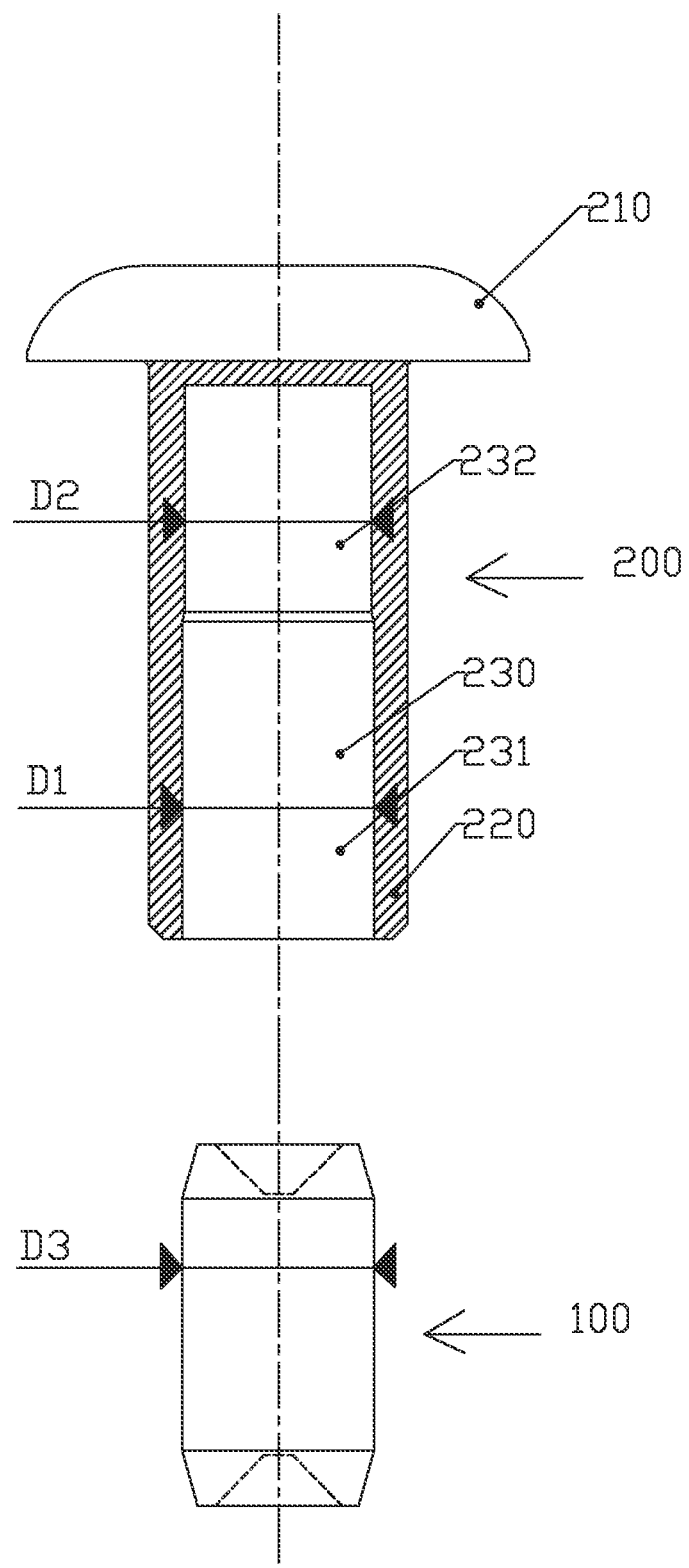
FIG. 1 is a schematic drawing of a view in cross section of the separate sleeve and insert making up a first embodiment of a riveting member according to the invention.

As illustrated in the drawing in FIG. 1, the riveting member referenced R overall comprises two parts:
an insert 100,
and a sleeve 200 adapted to at least partially contain the insert and having an end provided with a head 210 and a tubular end 220 able to be deformed with a view to constituting a bulb on one side of the materials to be assembled.

In accordance with the invention, the hollow core 230 has two different sections 231 and 232, that is to say volumes of the cylindrical recessing having different diameters, a first section 231 starting from the tubular end 220 to be deformed having a first diameter D1 and a second section 232 starting at the end of the first section 231 and with a lesser diameter D2.

These recesses with different diameters match the insert 100 which, not having a functional axial bearing surface, has a diameter D3 enabling it to be housed without deformation in the first section 231 of the hollow core 230 and to enable it to be housed forcibly in the second section 232 for purposes of radial swelling of the sleeve 100.

Thus the largest diameter D3 of the insert 100 is less than or slightly greater than the diameter D1 of the first section in order to enable it to be received without force and without deformation and is larger than the diameter D2 of the second section in order to cause the deformation of this sleeve part 200, which will be situated inside the hole passing through the parts to be assembled. As illustrated, the second hollowed out section with smaller diameter extends to below the head of the sleeve.

The riveting member is as illustrated by FIGS. 2, 3 and 4, with the insert 100 pre-engaged in the first part of the tubular core so that it can be managed as a solid rivet. This pre-engagement is maintained by a light tight mounting between the insert 100 and the first section 231, as illustrated in FIGS. 2 and 3, or by a deformation of the sleeve at three points 240 disposed at 120 degrees for purposes of clamping of the insert 100. As illustrated, the insert 100 projects out of the sleeve 200 in the pre-engaged position.

FIG. 3 illustrates more specifically a riveting member R' where the thickness of the sleeve part to be folded 220 is reduced also externally so that the force necessary for deformation thereof is reduced and the external shoulder defined by the separation between the two external cylinders facilitates and delimits the folding necessary for creating the bulb.

The materials used for producing the insert and/or the sleeve can be chosen from those known by the following designations:
titanium T40,
niobium-titanium,
stainless steel A286,
stainless steel 304L,
aluminium and alloys thereof,
etc.

According to an embodiment preferred for reasons of saving weight, low cost and simplicity of implementation, the insert is made from plastics material. This plastic insert can cooperate with a sleeve made from titanium T40.

According to another embodiment preferred for reasons of improved shear strength and capacity for elongation, the insert is made from grade 9 titanium.

The various steps of the assembly implemented by such a riveting member R will now be described with regard to the drawings in FIGS. 5 to 9.

Figure 5:
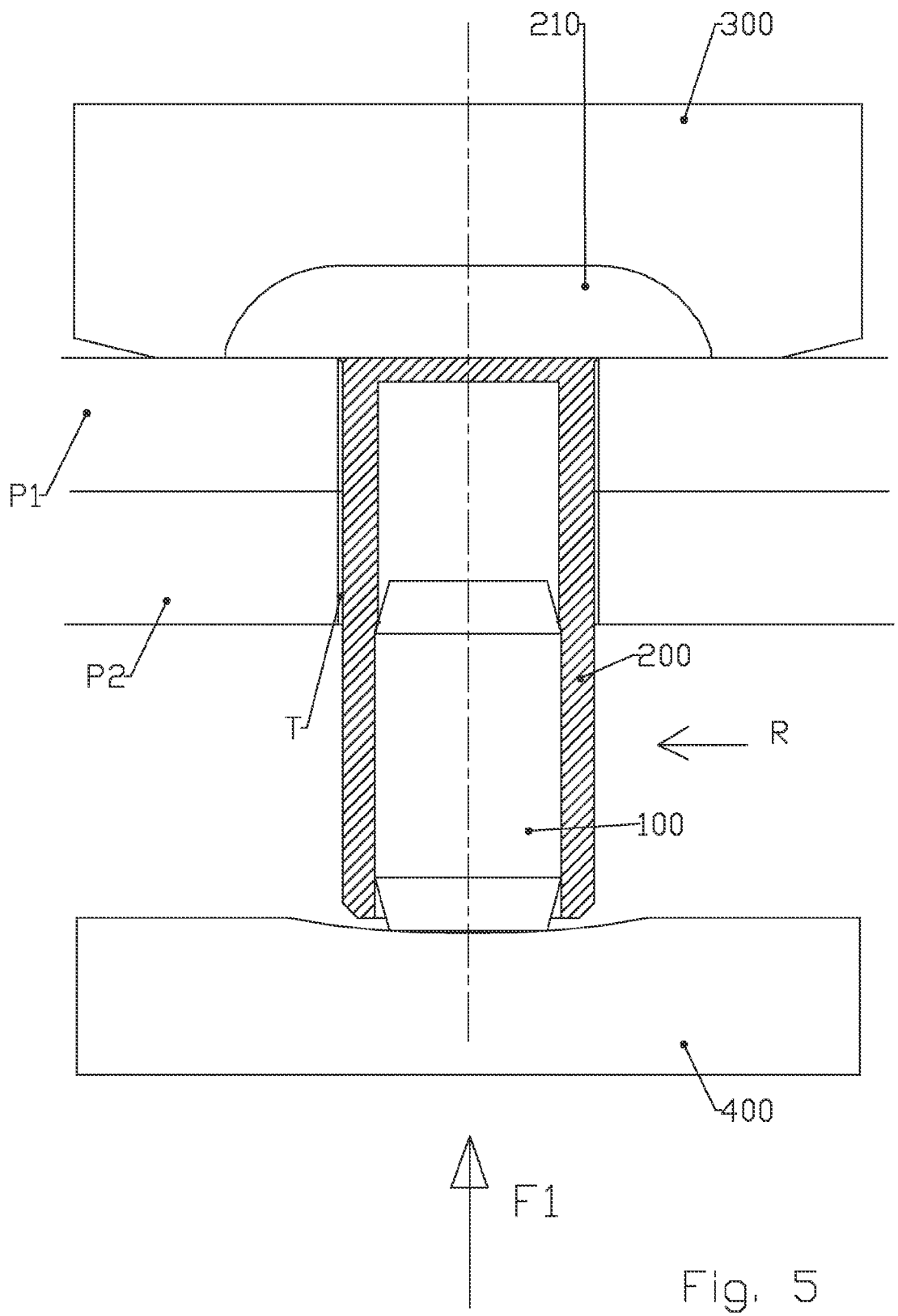
FIGS. 5, 6, 7, 8 and 9 are views in section of an assembly illustrating the fitting of the riveting member.

As illustrated on the drawing in FIG. 5, the riveting member R is disposed inside a hole T passing through two parts made from composite materials P1 and P2 to be assembled. The head 210 of the sleeve 200 comes into abutment on the external surface of P1 around the hole T. The diameter of the hole T is such that the body of the sleeve enters inside with clearance. In addition, the "foldable" portion of the sleeve projects out of the hole T on the same side as the part P2.

The sleeve head 210 is held in position by means of a fixed riveting die 300 and another movable riveting die 400 is disposed on the rivet head side and comes into abutment against the end of the insert 100 projecting out of the sleeve 200. In a movement represented by the arrow F1, the movable riveting die 400 exerts an axial pressure against the riveting member R for the purpose of inserting the insert 100, expanding the sleeve body 200 disposed in the hole, folding the sleeve body 200 disposed outside the hole T and crimping the sleeve body 200 on the body of the insert 100. In accordance with the invention, the length of the small section 232 corresponds substantially to the minimum thickness of the parts P1 and P2.

Figure 6:
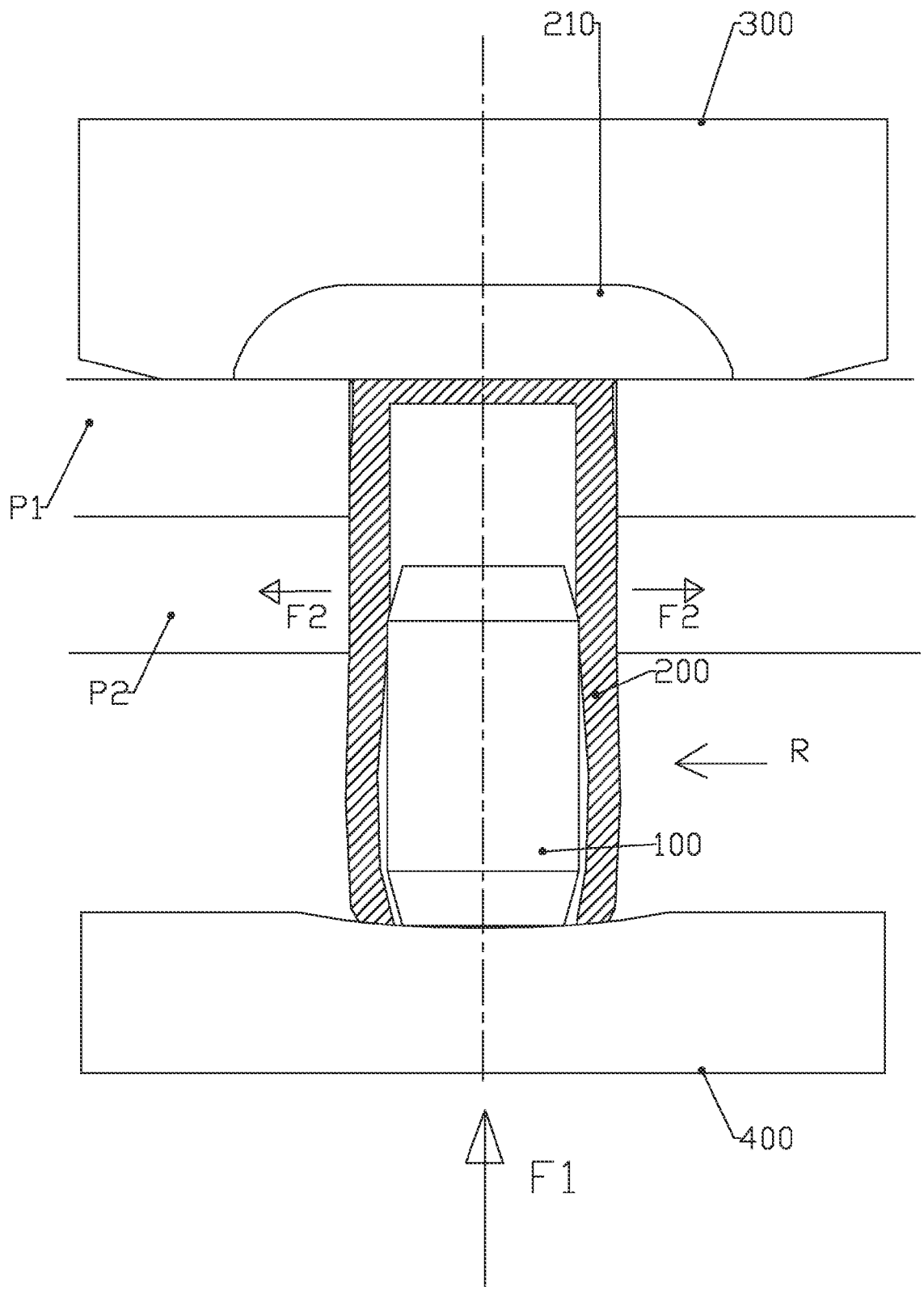

As illustrated in FIG. 6, under the effect of the movement of the movable riveting die 400, the insert 100 starts its forcible insertion in the sleeve body part situated in the hole T. In accordance with the invention, the effect of this insertion is a radial swelling of the sleeve, in the direction of the arrows F2, which tends to press the sleeve on the walls of the hole T and ensure the filling in of the clearance existing initially between the external periphery of the sleeve 200 and the internal surface of the hole T.

Figure 7:
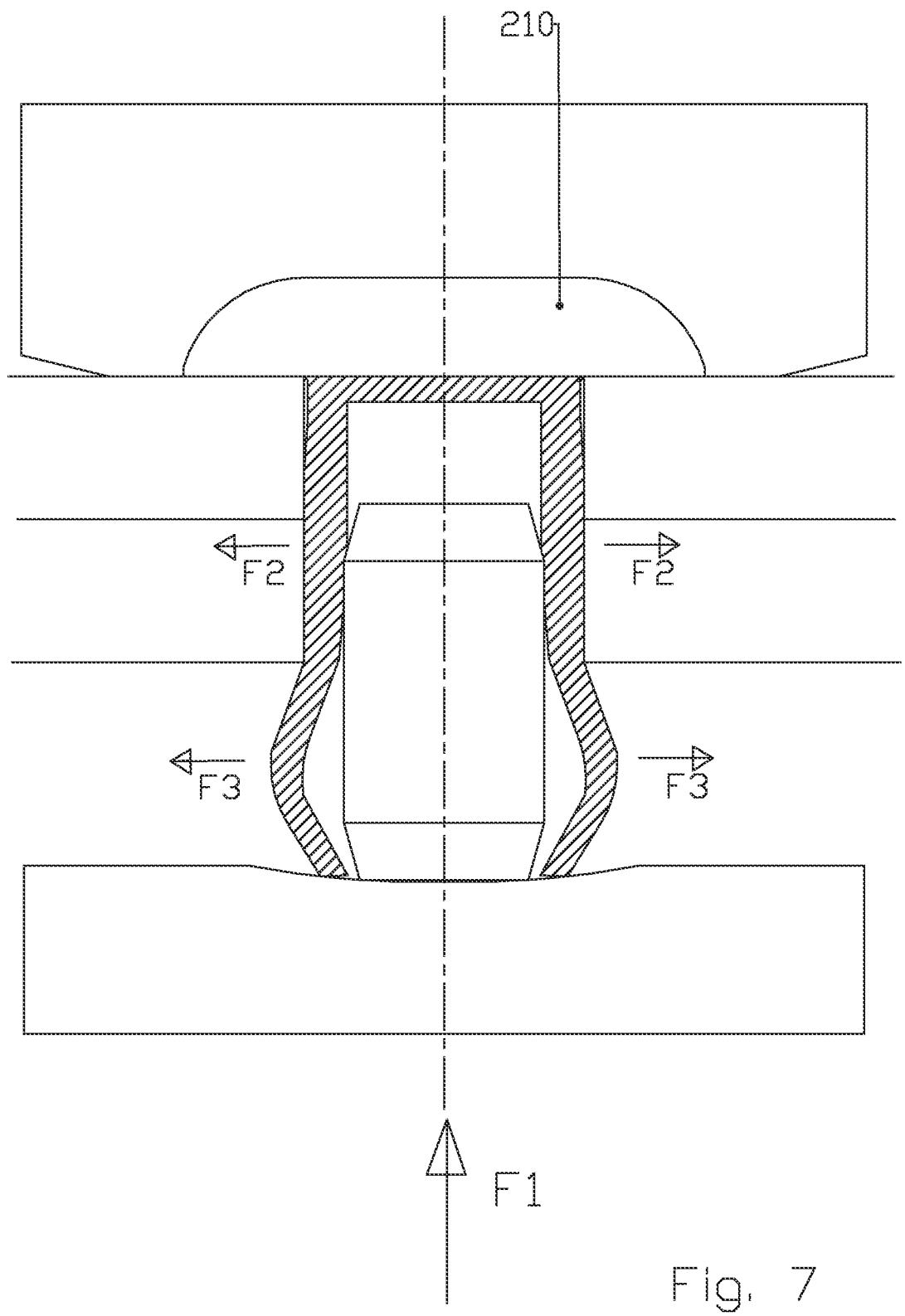

As illustrated in FIG. 7, the advancement of the insert 100 inside the sleeve 200 affords direct contact between the end 220 of the sleeve 200 and the movable riveting die 400. Thus, as the internal part of the sleeve swells, the external part of the sleeve is subjected to the pressure of the riveting die 400, which causes the start of the centrifugal folding by radial expansion in the direction of the arrows F3 of the external sleeve part 200. The prior swelling of the sleeve part 200 situated inside the hole T blocks any possibility of axial movement of the material of the sleeve 200 inside the hole T, which creates an abutment that will cause the folding of the external part and which prevents damage to the rim of the hole T.

Figure 8:
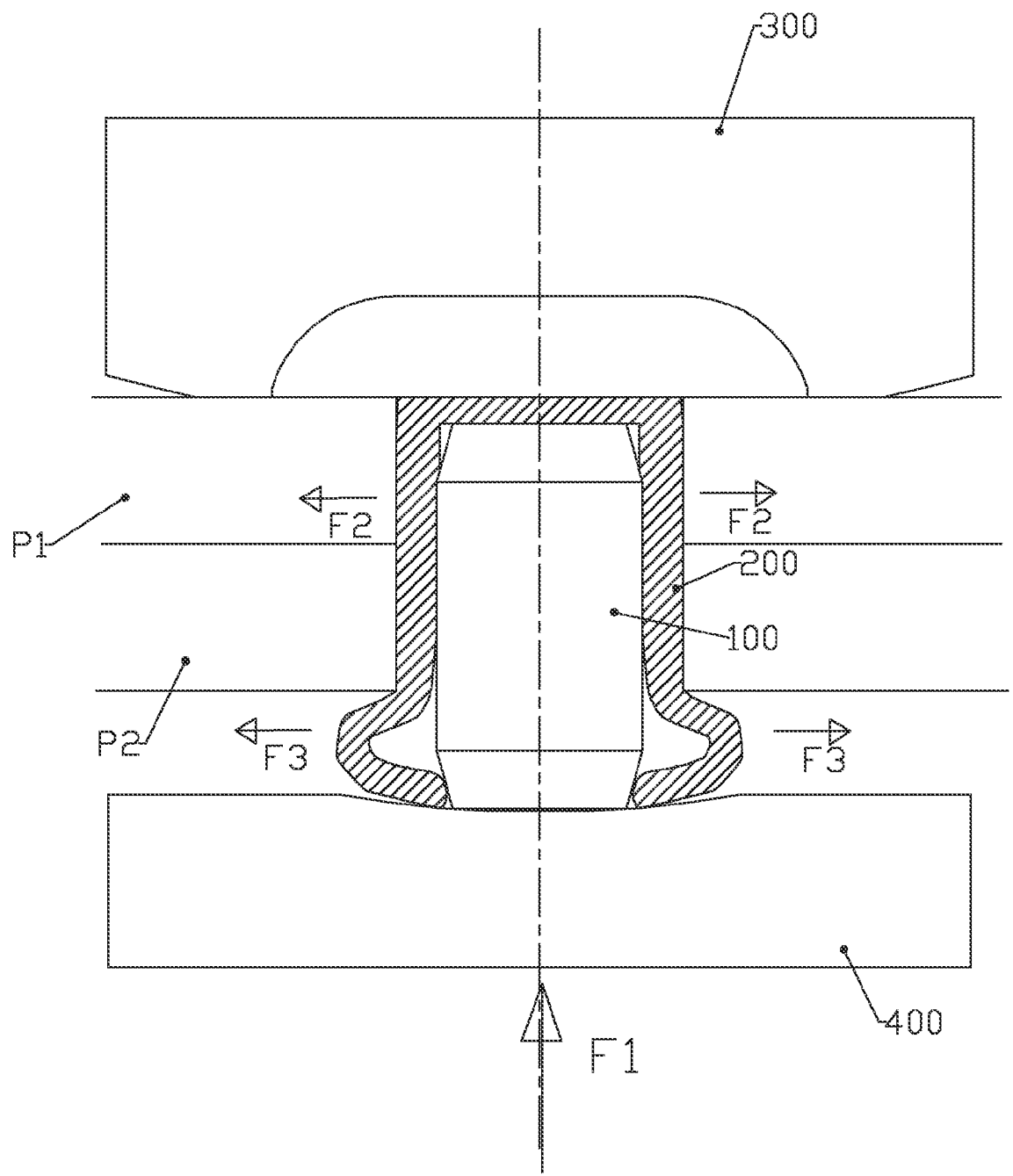

As illustrated on the drawing in FIG. 8, while effecting, through its adapted dimensions, the swelling of the part of the sleeve 200 situated inside in the hole T, the insert 100 bears at the tubular portion bottom and occupies the whole of the internal recess of this sleeve part 200, thus changing the riveting member R to a configuration of the solid rivet type. By virtue of this configuration, almost all the external surface of the sleeve part situated inside the hole T has undergone a swelling, the elastic return of which will be negligible, which maintains radial stresses inside the hole T. In addition, the external end of the sleeve 200 that undergoes the folding is guided during this operation by the body of the insert, guaranteeing regularity in deformation.

Figure 9:
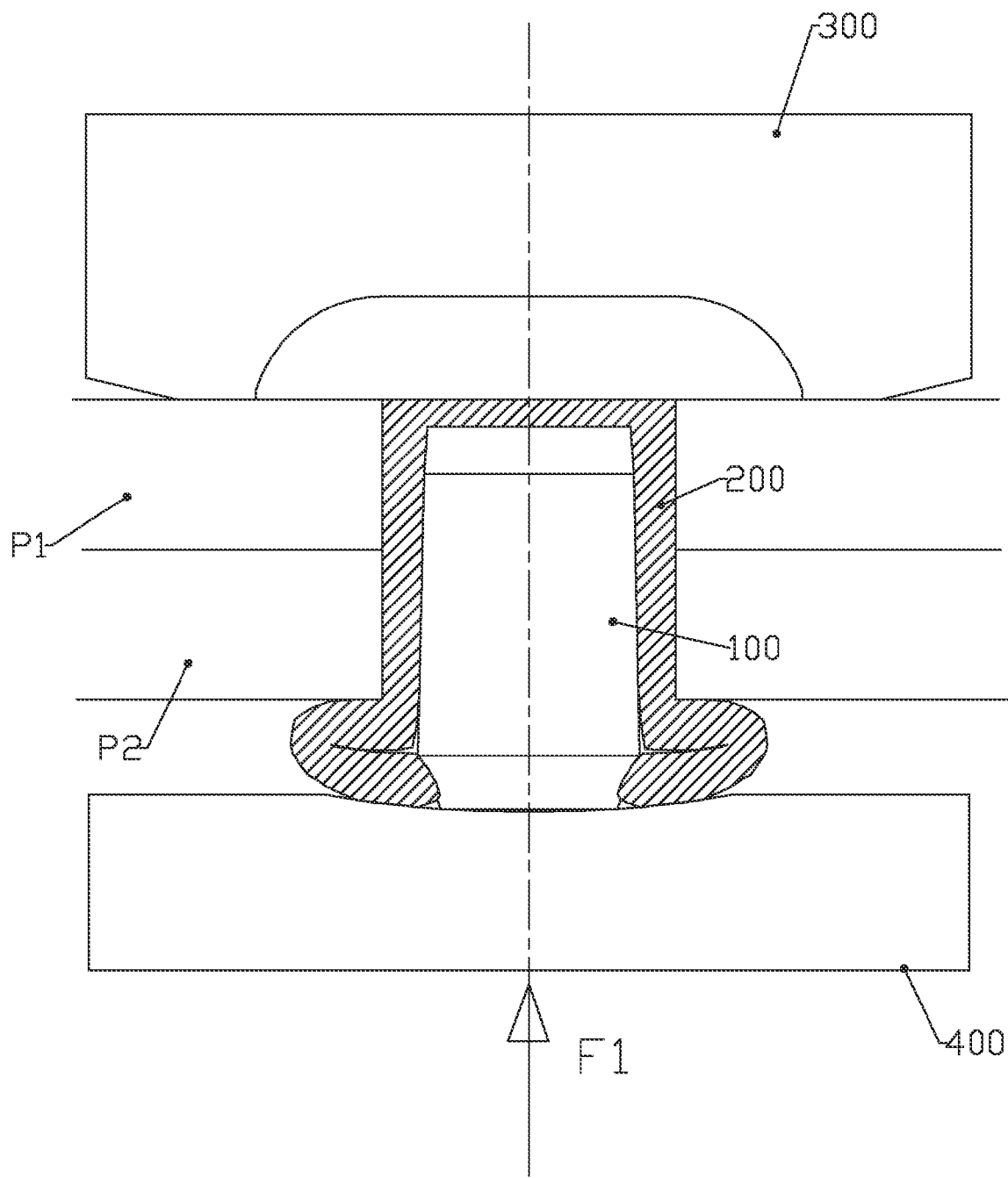

As illustrated on the drawing in FIG. 9, the continuation of the axial movement of the riveting die 400 in the direction of the arrow F1 ends the folding of the sleeve 200 for the creation of a bulb bearing on the piece P2 around the hole T. In addition, the insert 100 will deform and the end of the bulb will be crimped on the body of the insert 100 for the purpose of guaranteeing locking.

Figure 10:
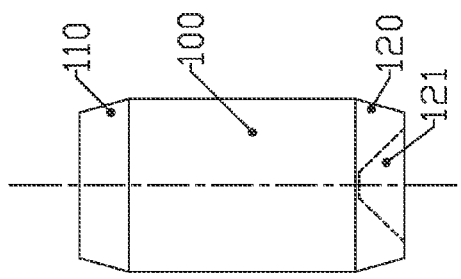

In order to facilitate this final deformation as well as the crimping, several embodiments of insert 100 have been imagined. Thus, for example, FIG. 10 shows an insert 100 generally cylindrical in shape, the two ends 110 and 120 of which are beveled externally and the end 120 of which, corresponding to the end on which the sleeve 200 is crimped, comprises a recess 121 facilitating deformation thereof.

Figure 11:
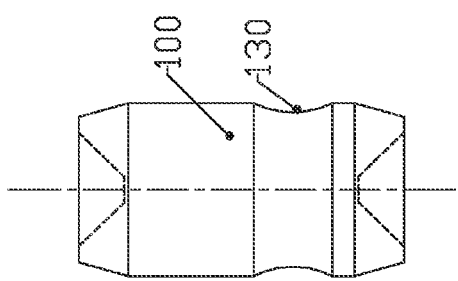

FIG. 11 shows an embodiment of an insert 100, the body of which is preformed with a groove 130 situated close to the end 120 and the two ends of which are provided with a recess.

Figure 12:
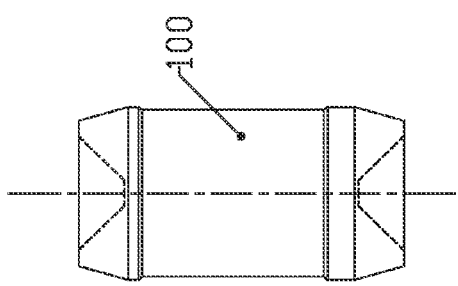

FIG. 12 shows an insert the body of which is provided over almost all its periphery with a narrowing of its diameter.

Figure 13:
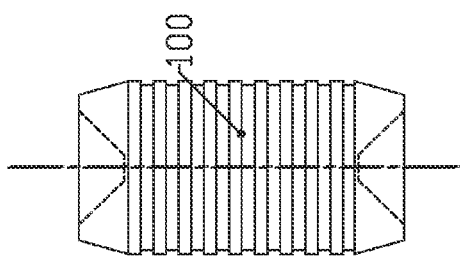

FIG. 13 shows an insert 100 the body of which is provided with flutes that will facilitate crimping.

The embodiments illustrated by the drawings in FIGS. 1, 11, 12 and 13 show a recess provided at the two ends of the insert.

Figure 14:
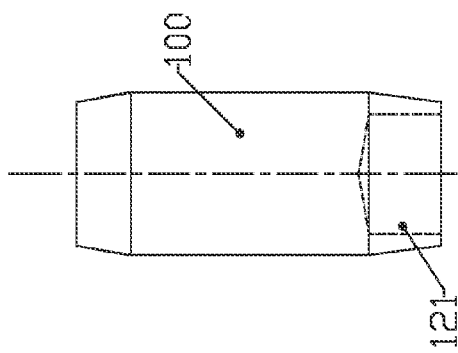
FIGS. 10, 11, 12, 13 and 14 illustrate various embodiments of the insert for the aforementioned embodiments of the riveting member.

Finally, FIG. 14 illustrates a recess 121 allowing deformation of the end 120 of the insert with less force.

Figure 15:
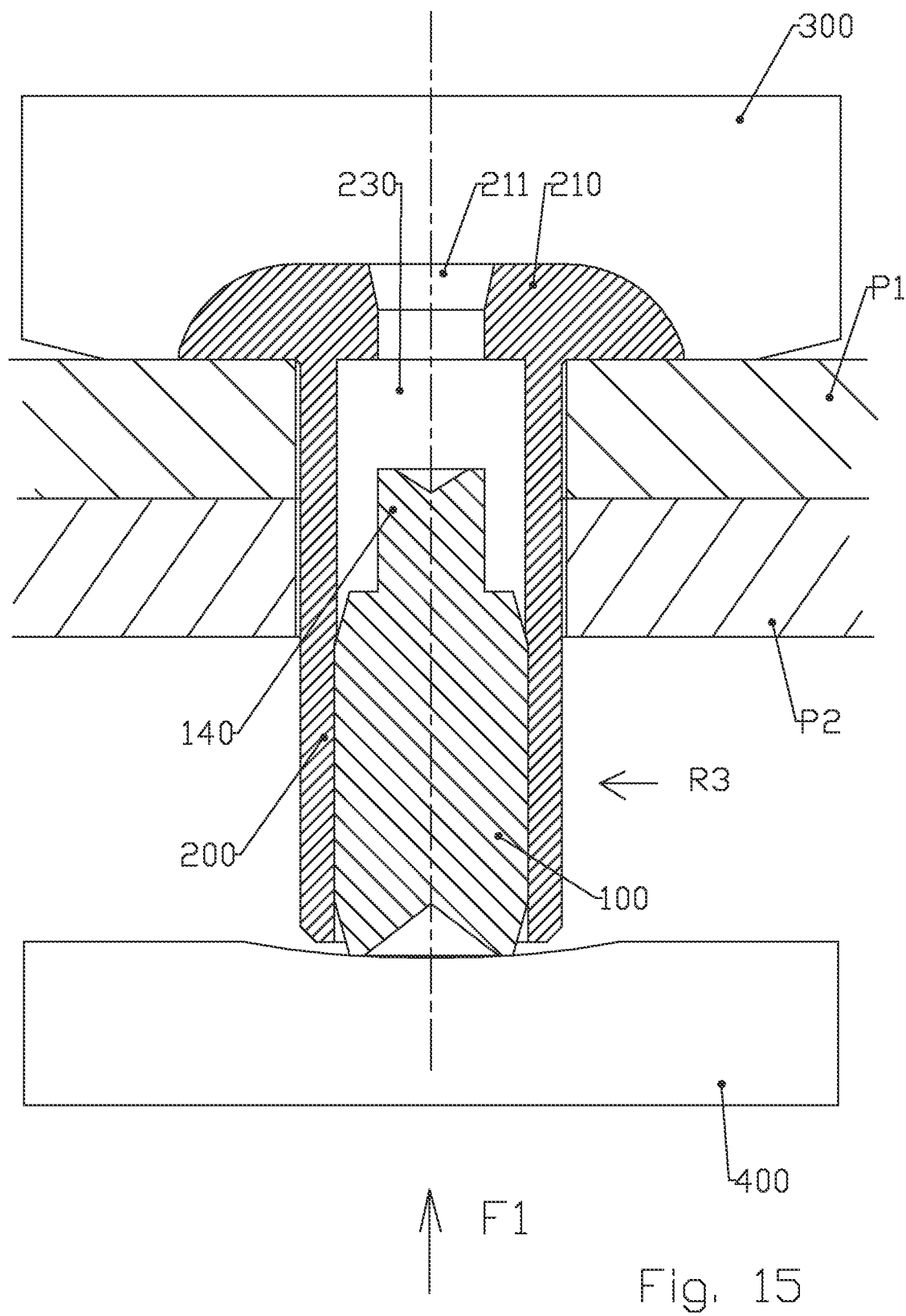
FIGS. 15 and 16 illustrate, in a configuration ready to be fitted and in a configuration once fitted, another embodiment of a riveting member according to the invention.
Figure 16:
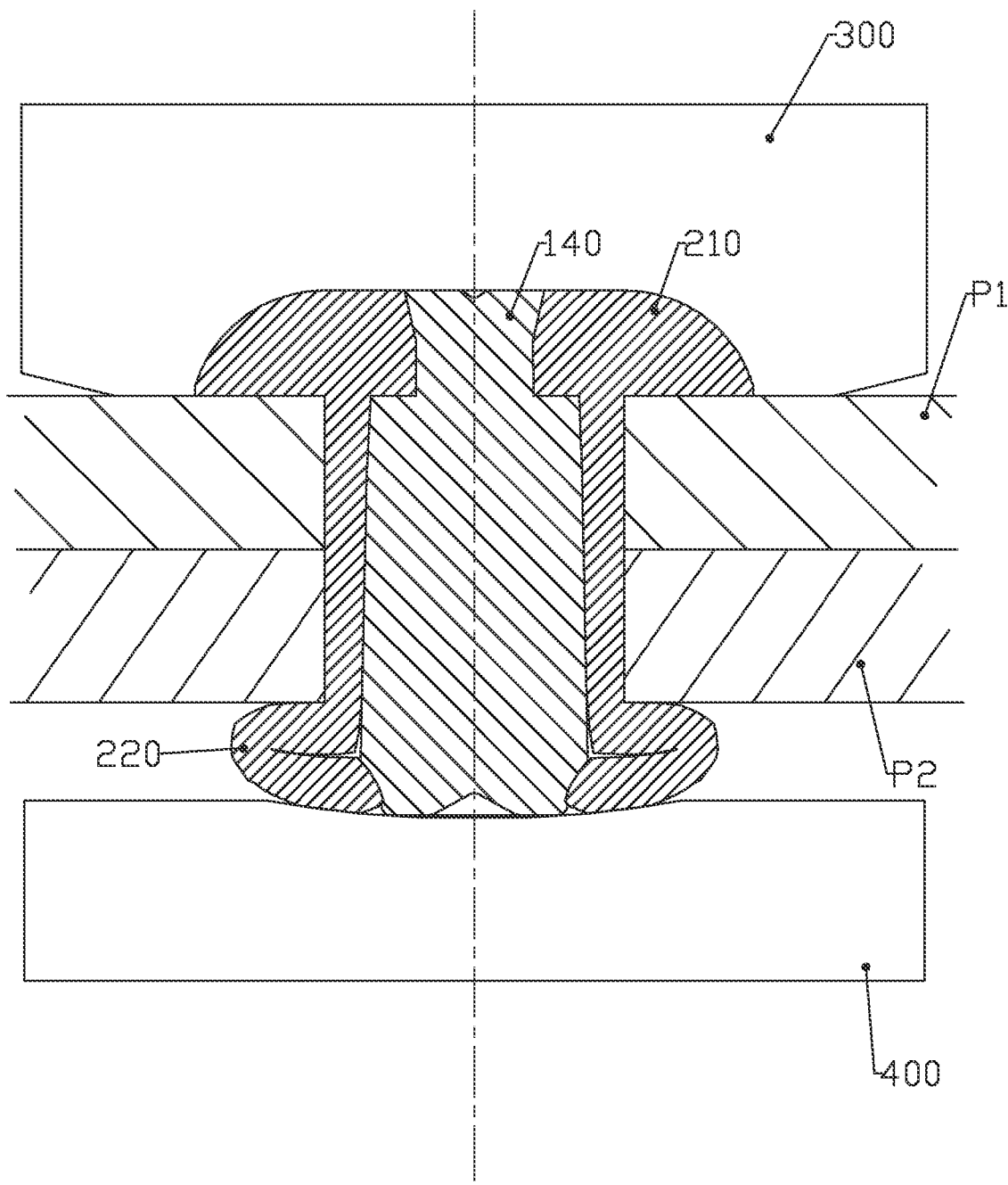

As illustrated in the drawings in FIGS. 15 and 16, the riveting member R3 is equipped with a sleeve 200, the recess 230 of which passes right through it. The adapted insert 100 comprises dimensions such that its two ends are respectively crimped in the head of the sleeve 210 on the one hand and in a bulb formed by the tubular end 200 of the sleeve once folded on the other hand.

As illustrated, the recess 230 provided in the sleeve 200 is extended in the head 210 so that the suitably shaped end 140 of the insert 100 can be crimped in said head 210 in order to optimise locking. Insertion is achieved by the emerging tubular end not equipped with the head. According to the embodiment illustrated, the cross section of the recess 211 formed in the head 210 is less than the cross section 232 of smaller diameter D2 of the recess 230 formed in the sleeve.

The end 140 of the insert that has just been crimped in the head by the translation movement represented by the arrow F1 is in the form of a cylindrical projection coaxial with the rest of the insert, and the free end of which is itself provided with a recess facilitating deformation thereof. To accommodate it, the recess 211 formed in the head splays in the direction of the progression of the insert in the sleeve in order to accept the volume of the deformed material of the head 140 of the insert 100 and thus optimise locking.

It will be understood that the riveting methods and members that have just been described and depicted above were so described and depicted with a view to a disclosure rather than a limitation. Naturally various arrangements, modifications and improvements could be made to the above example without for all that departing from the scope of the invention.

Thus for example, although the embodiment presented illustrates a rivet provided with a protruding head, the riveting member may be of the type comprising a sleeve with a countersunk head.

The invention claimed is:

1. Method of assembling parts made from composite materials by means of a riveting member of the type comprising firstly an insert and secondly a sleeve adapted to at least partially contain the insert and having an end provided with a head and a tubular end able to be deformed with a view to constituting a bulb on one side of the materials to be assembled, a hole passing through the materials to be assembled being produced, the sleeve being introduced and held in the hole with its head in abutment on the rims of the end of the hole and so that its tubular end projects therefrom on the other side, said method being characterised in that it consists of:

using a sleeve the hollow core of which has two different sections, a first section starting from the tubular end to be deformed having a first diameter and a second section starting at the end of the first section and with a lesser diameter, using a insert not having a functional axial bearing surface for purposes of radial swelling of the sleeve in a hole but the diameter of which is able to allow housing thereof without deformation in the first section of the hollow core and able to allow forcible housing thereof in the second section, axially introducing the insert in the sleeve so that the latter swells radially inside the hole at its small section and the recess defined by this small section is occupied by said insert, and providing, by means of a riveting die, a pressure at the end of the sleeve to be deformed on its first section in order to ensure folding thereof by centrifugal radial extension.

2. Method according to claim 1, characterised in that it consists of pre-engaging the insert in the first section of the tubular end of the sleeve prior to the engagement of the riveting member in the hole.

3. Method according to claim 1, characterised in that it consists of ensuring the forcible insertion of the insert in the second section and the folding of the first section in the same movement of the riveting die so that said folding is guided by the body of the insert.

4. Method according to claim 1, characterised in that it consists of continuing the folding until the folded end is crimped on the insert.

5. Method according to claim 1, characterised in that it consists of producing a hole without countersink in the composite material on the bulb side.

6. Assembly method according to claim 1, characterised in that it consist of using a sleeve the recess of which passes right through it axially and inserting the insert through the end of the recess emerging in the head.

7. Assembly method according to claim 1, characterised in that it consists of using a sleeve the recess of which passes right through it and inserting the insert through the tubular end of the sleeve, the insert comprising dimensions such that its two ends are respectively crimped in the head of the sleeve on the one hand and in the bulb formed by the tubular end of the sleeve on the other hand.

\* \* \* \* \*